July 31, 1962  A. PAUL  3,047,160
TRUCK CRANE

Filed Jan. 3, 1961  9 Sheets-Sheet 1

FIG.1

INVENTOR
Adolf Paul

July 31, 1962 A. PAUL 3,047,160
TRUCK CRANE
Filed Jan. 3, 1961 9 Sheets-Sheet 6

INVENTOR
Adolf Paul

July 31, 1962   A. PAUL   3,047,160
TRUCK CRANE
Filed Jan. 3, 1961   9 Sheets-Sheet 9

INVENTOR
Adolf Paul

United States Patent Office 3,047,160
Patented July 31, 1962

3,047,160
TRUCK CRANE
Adolf Paul, Moosburg, Germany, assignor to Steinback G.m.b.H., Moosburg, Upper Bavaria, Germany
Filed Jan. 3, 1961, Ser. No. 80,164
12 Claims. (Cl. 212—35)

This invention relates to truck cranes, and more particularly to the type of truck crane intended to load material on the truck itself.

The type of truck crane with which this invention is more specifically concerned is distinguished from mobile cranes in which the truck merely serves as movable base for the crane by the requirement that the crane occupy as little space on the truck platform as possible and have no more weight than is unavoidable in order to provide space and carrying capacity for a load which is to be transported. The truck esentially is a freight vehicle with an auxiliary crane, whereas mobile cranes are essentially pieces of equipment intended for stationary use, and equipped with built-in auxiliary transport means. It follows from this distinction that mobile cranes are subject to less stringent requirements as to mobility and required clearance than truck cranes which should not exceed the normal clearance of a truck in a vertical plane transverse to the direction of movement when the crane is inoperative and the vehicle is moving.

A primary object of the invention is the provision of a truck crane which combines minimum clearance requirements with minimum encumbrance of the load space on the truck platform when the crane is inoperative.

More specifically, the invention aims at providing a crane which is rotatable about a vertical axis adjacent the operator's cab at one end of the truck platform which in the inoperative position does not, or not substantially extend above the roof line of the cab, and yet permits rotation of the crane in the operative position through an angle of more than 180°, and preferably through 360°.

At the same time, the crane should laterally project beyond the sides of the truck as little as possible, and if so, by substantially equal distances from the median plane of the truck when the crane is in the inoperative position and the jib or beam of the crane extends transversely of the direction of truck movement.

With these and other objects in view, the invention in its more specific aspects contemplates the use of a foundation on the truck platform on which a base member is rotatable about a vertical axis. A pillar is pivoted by one longitudinal end portion to the base member so that it may pivot in a vertical plane. The other end portion of the pillar hingedly carries one end of the jib. A hydraulic jack, the piston and cylinder of which are respectively connected to the pillar and the foundation actuates the pivoting movement of the pillar between a vertical operative position and an inclined inoperative position. Separate actuating means are provided for hingedly moving the jib relative to the pillar. The jib has a rest position in which it extends approximately parallel to the roof line of the cab and is at least to a major extent located below the roof line when the pillar is in its inoperative position, whereas at least the hinged end of the jib is raised above the cab's roof line when the pillar moves into the operative position.

Preferably, the pillar extends in its inoperative position from the foundation obliquely toward a point in line with the horizontal position of the jib and laterally spaced towards one side from the median plane of the vehicle as far as the free end of the jib is spaced from the median plane toward the other side, so that the pillar and jib require minimum lateral clearance while occupying as little space as possible on the truck platform in the longitudinal direction.

Other features and many of the attendant advantages of this invention will be readily apparent from consideration of the following specification relating to the annexed drawings, in which.

Referring now to the drawings in detail, and initially to FIGS. 1 to 4, there are seen elements of a truck resting on a rear axle assembly 1 including wheels 2 and mounted on a frame 3 by means of a suspension 4. The frame 3 carries a platform 5 best seen in FIG. 4 and omitted from the showing of FIGS. 1 to 3 together with the frame 3 to avoid crowding of the drawing with conventional elements. The platform 5 extends from the rear end of the truck forward to an area rearwardly adjacent the cab 6 for the truck operator.

A heavy fixed foundation member 10 is fixedly secured to the truck frame 3 at the front end of the platform. It has lateral arms 12, 14 equipped with the telescoping legs 16, 18 which can be extended to the ground on which the truck is standing in order to prevent tilting of the vehicle during operation of the crane. A housing 20 of approximately cylindrical shape extends upward from the foundation and contains the mechanism for actuating rotary movement of the crane about vertical and horizontal axes.

A base member 24 having the approximate shape of a box which has been cut open in an oblique plane is rotatably mounted on the top of the housing 20. A rear wall 25, a longer side wall 32 and a shorter side wall 33 are seen extending upward from a bottom wall 26. A pivot pin 30 extends between the rear wall 25 and a front wall 25' not visible in FIGS. 1 to 4 near the corner formed by the bottom wall 26 and the shorter side wall 33. The side walls 32 and 33 act as stops which limit the pivoting movement of a pillar 28 one end of which is pivotally secured to the base 24 by the pivot pin 30. The axis of the pin is laterally offset from the vertical axis of rotation of the base member 24 on the housing 20.

The free end of the pillar 28 carries a jib or beam 34 which is hinged ot the pillar 28 by a pivot pin 36. Mutual abutment of fixed elements of the pillar 28 and the jib 34 limit the angular movement of the free end of the jib toward the pillar to the terminal position illustrated in FIGS. 1 to 3 in which the longitudinal axes of the pillar and jib enclose an acute angle of approximately 60° in which the triangle defined by the pillar and the jib has minimum dimensions affecting the clearance requirements of the vehicle. This position of the jib will hereinafter be referred to as the rest position. It is assumed by the jib 34 in the absence of external forces acting to rotate the jib counterclockwise, as viewed in FIGS. 1 to 3, about the pin 36.

Such counterclockwise movement can be actuated by a hydraulic jack 38 the cylinder member of which is hingedly connected to the lower end of the pillar 28 by a shaft 40. As will be discussed in more detail hereinafter, the pillar 28 is composed of a plurality of longitudinally extending plate members which are transversely linked by the shaft 40. The piston member of the jack 38 is similarily attached to a hinge pin 42 which is fastened in lugs of the jib 34. When hydraulic fluid under pressure is admitted to the jack 38, the jib 34 is moved angularly away from the rest position into angular alignment with the pillar 28 at right angles or even at an obtuse angle as seen in FIG. 3.

An extension arm 44 is telescopically slidable in the jib 34 which is built up of plate members enclosing a central cavity. The free end of the extension arm 44 carries a pulley 100 from which the crane hook 46 is suspended in the conventional manner by means of a chain 47, a rope, a steel cable, or the like. The extension arm 44 can be secured in its longitudinal position in the jib 34 by a locking lever 39. Depending on the position of the extension arm 44 in the jib 34, the effective range of the crane hook 46 about the axis of rotation of the base member 24 may be varied over a wide range as best seen from FIG. 4.

Figure 11:
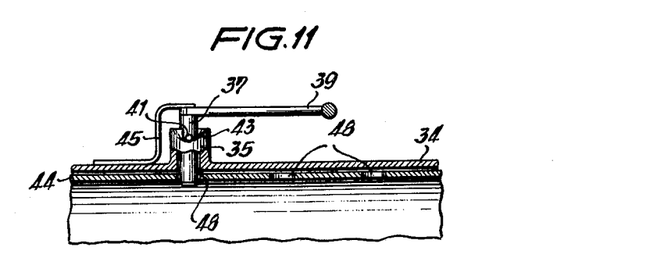
FIG. 11 illustrates another detail in sectional plan view.

As seen in FIG. 11 on an enlarged scale, the lever 39 is fixedly fastened to a locking pin 37 which is rotatable and axially slidable in a short tubular side arm 35 of the jib 34. A transverse guide pin 41 mounted on the locking pin 37 is urged into contact with an annular cam face 43 on the side arm 35 by a relatively heavy leaf spring 45. In the position illustrated in FIG. 11, the lever 39 longitudinally extends in the direction of elongation of the jib 34, and the locking pin 37 projects through the side arm 35 inward of the jib 34 into one of several longitudinally spaced openings 48 in the telescoping extension arm 44, thus securing the position of the latter in the jib 34. When the lever 39 is pivoted about the axis of the pin 37, the interaction of the guide pin 41 with the cam face 43 causes withdrawal of the locking pin 37 from the engaged opening 48 against the restraint of the spring 45 thus permitting adjustment of the longitudinal position of the extension arm 44. The spring 45 prevents accidental rotation of the lever 39 from its locking position.

Figure 1:
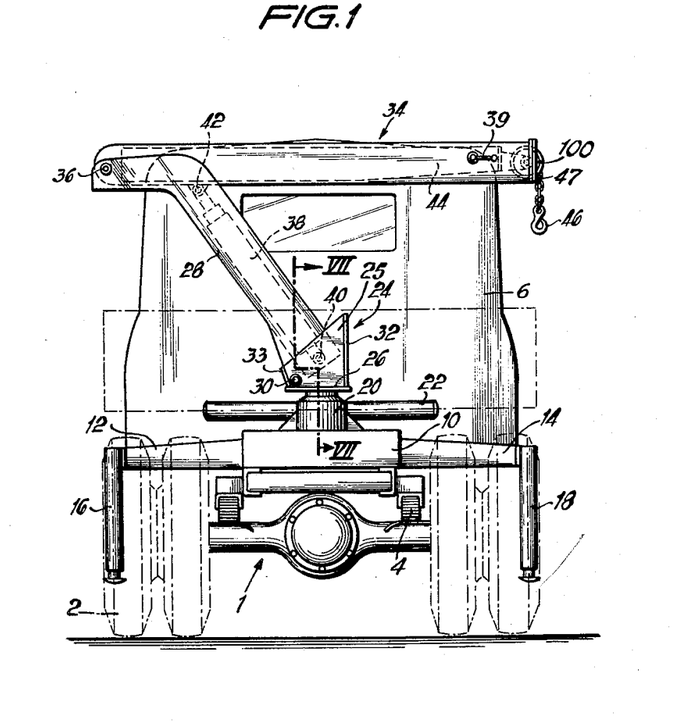
FIG. 1 shows a preferred embodiment of a truck crane of the invention in rear elevational view with the crane in the inoperative position.
Figure 2:
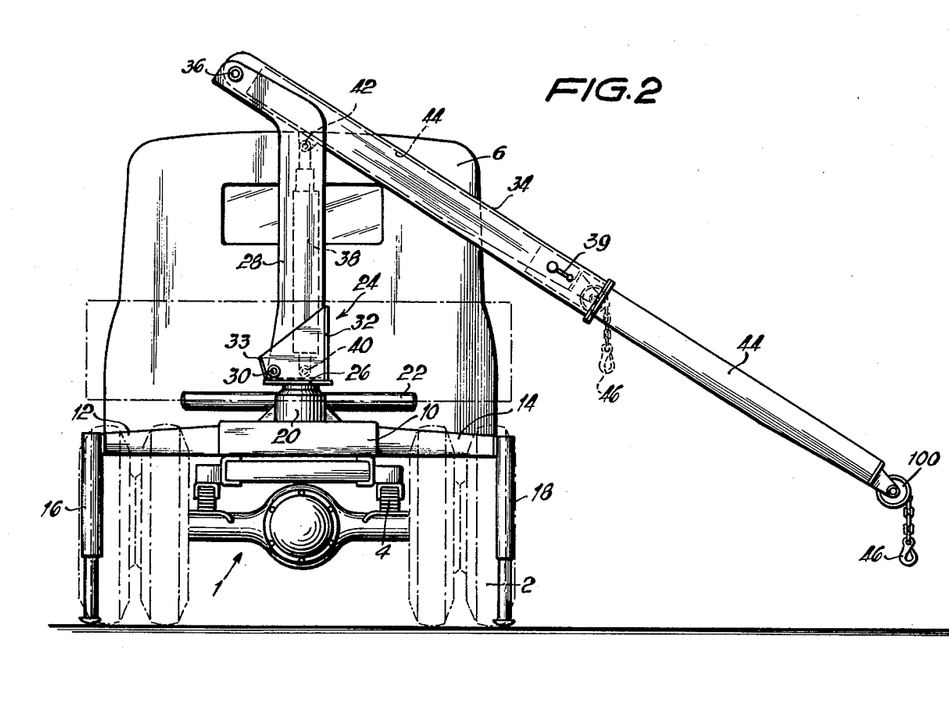
FIG. 2 shows the apparatus of FIG. 1 with the crane in operative position.
Figure 3:
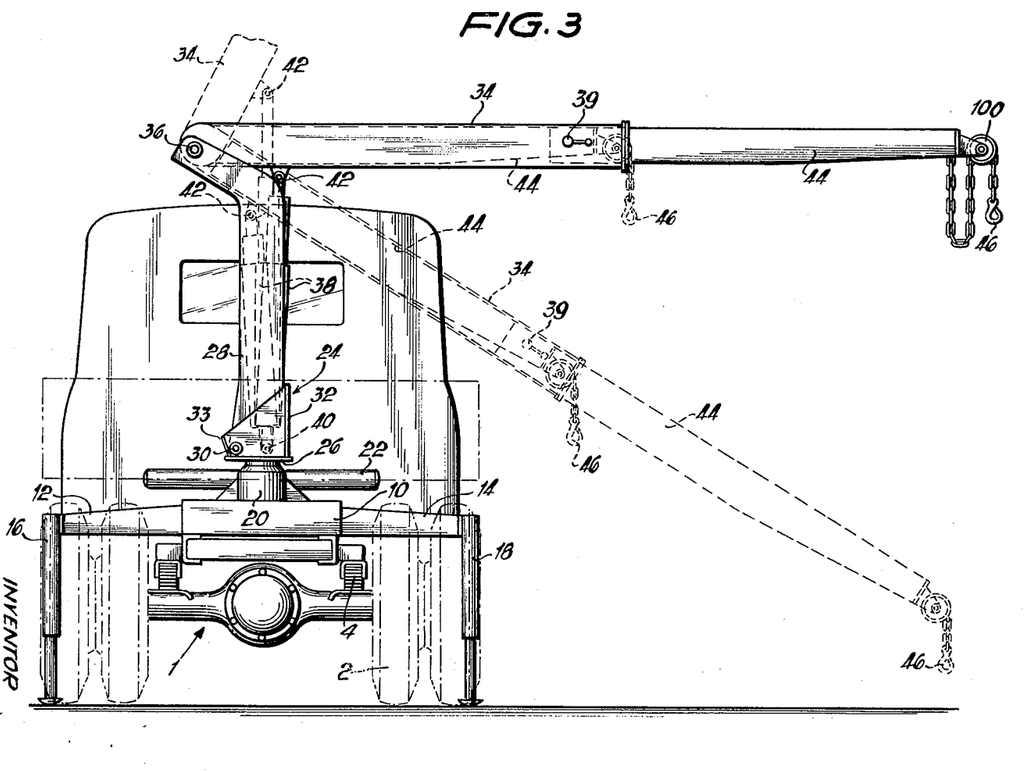
FIG. 3 illustrates additional operative positions of the truck crane of FIG. 1.
Figure 4:
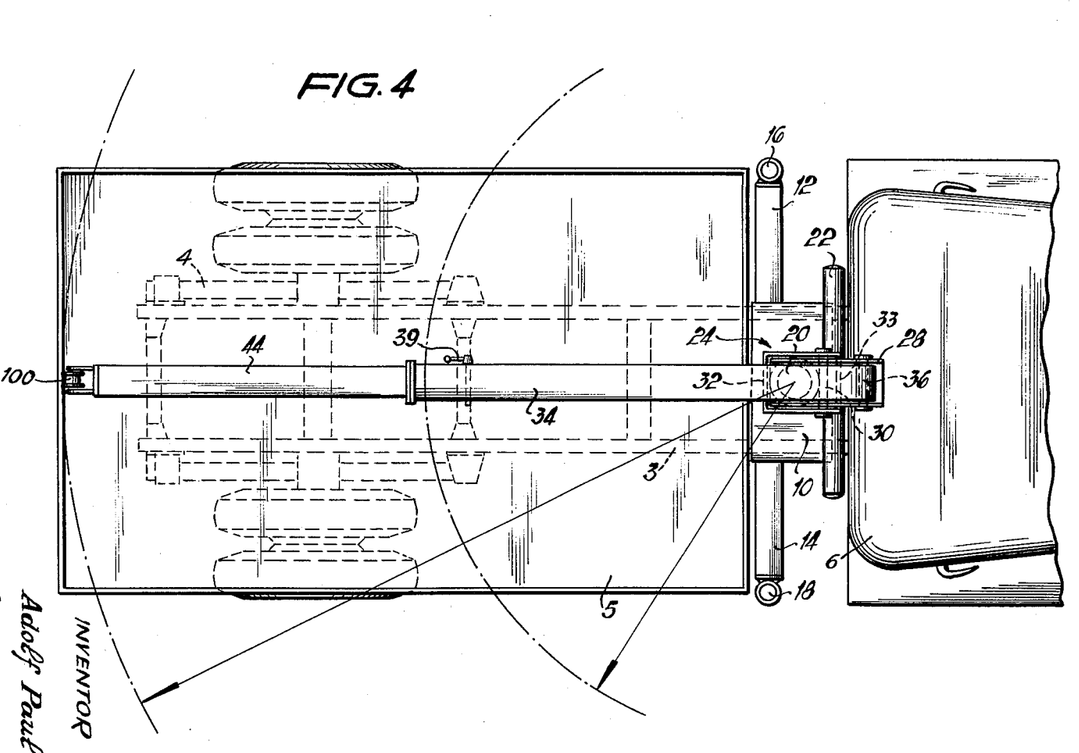
FIG. 4 shows the truck crane of FIG. 1 in plan view, the crane being seen in an operative position.

As is evident from FIGS. 2 and 3, the pivot pin 36 and the end of the jib 34 are raised above the roof line of the cab 6 when the pillar 28 is moved from the inclined inoperative position of FIG. 1 into its substantially vertical operative position. Because of the acutely angular relationship of the pillar 28 and the jib 34, raising of the attached end of the jib lowers its free end and thus brings the locking lever 39 within reach of an operator standing at the side of the truck. He may then extend the arm 44 as required and secure it in the extended position. Admission of pressure fluid to the cylinder of the jack 38 then raises the jib 34 with the extension arm 44 so that it eventually reaches the position shown in fully drawn lines in FIG. 3 in which the jib 34 clears the roof of the cab and may be swung through a full circle by rotation of the base member 24 on the truck.

Figure 5:
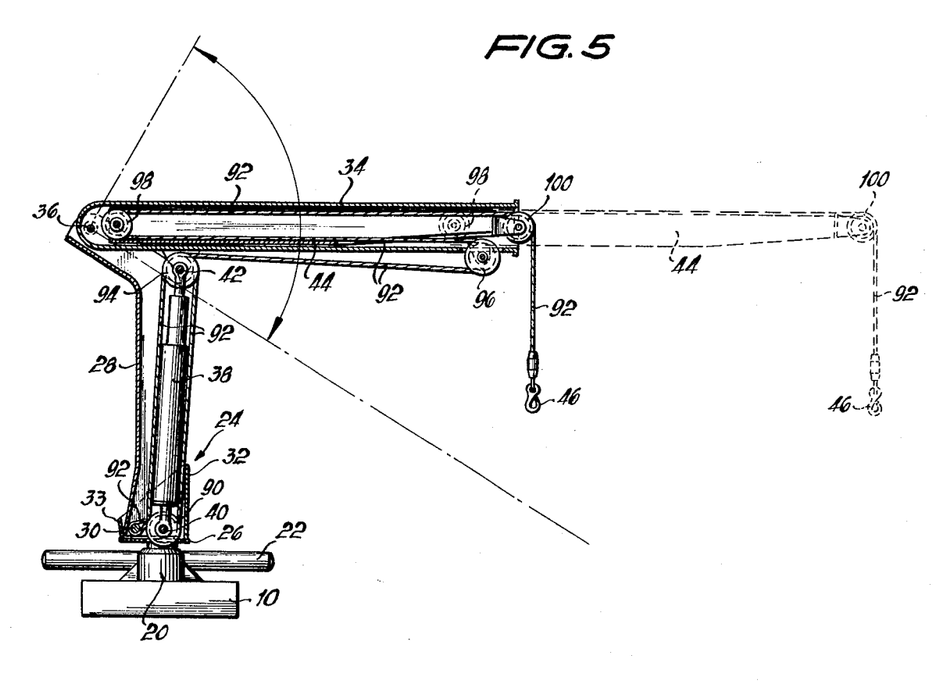
FIG. 5 illustrates a tackle arrangement for the crane of the invention in diagrammatic elevation.
Figure 6:
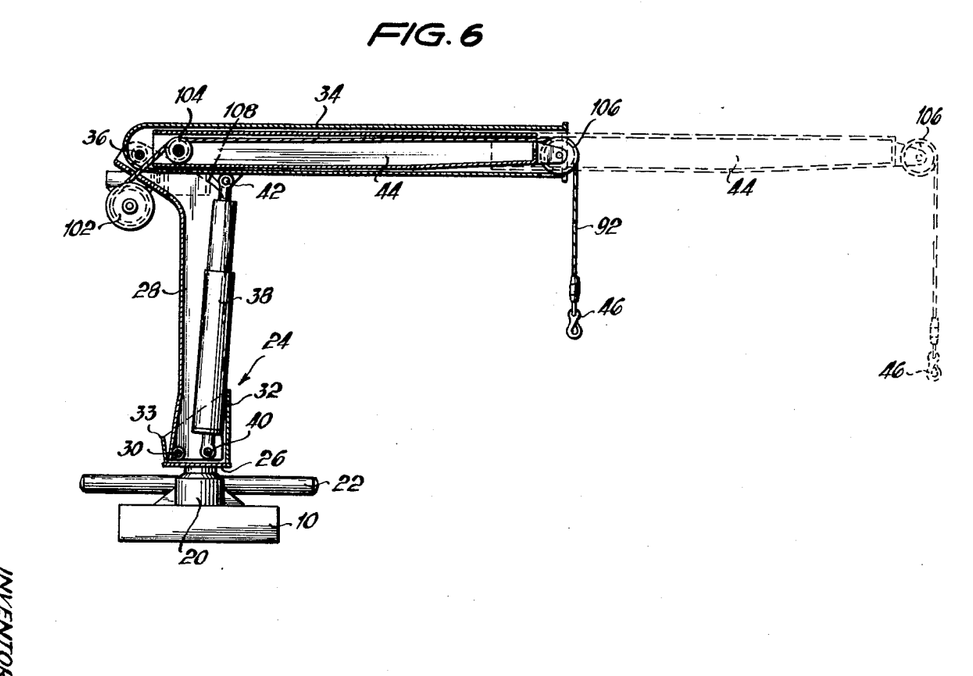
FIG. 6 shows a modified tackle arrangement in a view similar to that of FIG. 5.

Examples of tackle arrangements which may advantageously be employed with the pillar, jib and extension arm described are illustrated in FIGS. 5 and 6 which show only as much of the crane structure proper as is required for an explanation of the tackle arrangement.

Referring first to FIG. 5, there is shown a steel rope 92 one end of which carries the crane hook 46. The other end is looped about the pivot pin 30 and fastened thereon. It then passes first over one of two pulleys 90 journaled on the shaft 40, thence over one of two pulleys 94 journaled on the hinge pin 42. The rope is passed back and forth over the second pulleys 90 and 94 for the desired mechanical advantage, then over a pulley 96 near the free end of the jib 34, a pulley 98 at the fastened end of the jib 34 and ultimately over the pulley 100 at the free end of the extension arm 44.

This tackle arrangement operates as follows:

When the extension arm 44 is extended outward of the jib 34, the length of the rope portion depending from the pulley 100 is increased by the change in the distance of the pulleys 96 and 98. The hydraulic jack 38 is thereafter expanded and the hook is raised by the resulting shortening of the depending rope portion. Because of the mechanical advantage of the block arrangement 90, 94, the shortening of the rope portion is four times the increase in distance of the pulleys 90 and 94. Simultaneously, the load is also lifted by the concurrent rise of the free end of the extension arm 44. The tackle arrangement illustrated may also be employed to draw heavy objects toward the crane truck over substantial distances. A relatively long length of rope can be wound between the pulleys 90 and 94, and additional lengths of rope may be temporarily attached to the hook 46 to reach objects out of range of the rope 92 itself.

In the embodiment of the invention illustrated in FIG. 6, the movement of the rope 92 is independent of the actuating mechanism for pivoting the jib 34. A hoisting drum 102 is mounted on the underside of the attached end of the jib 34 and is actuated by an electric gear motor 108 in a well-known manner. The rope passes from the drum 102 over a guide pulley 104 near the drum, and then over a pulley 106 at the free end of the extension arm 44 toward the hook 46.

Figure 7:
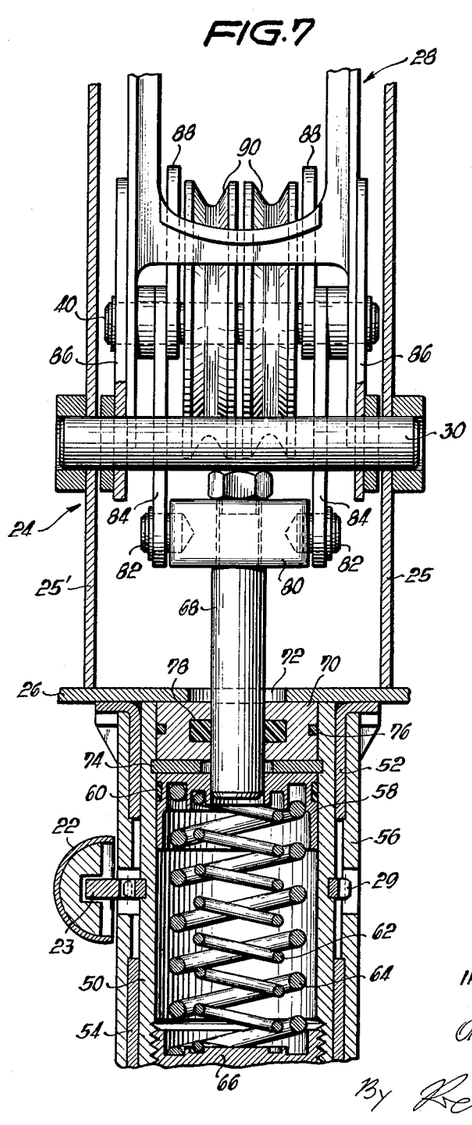
FIG. 7 is a fragmentary elevational view of the apparatus of FIG. 1 in section on the line VII—VII.

FIG. 7 shows a preferred embodiment of the mechanism for rotating the base member 24 on the foundation member 10. The view of FIG. 7 shows a portion of the apparatus of FIG. 1 in section partly on the vertical axis of rotation of the base member 24, that is, on the line VII—VII. The housing 20 and other aforedescribed structural elements have been omitted for the sake of clarity.

A hollow shaft 50 is welded to the bottom 26 of the base member 24. It is journaled in two axially spaced bearing sleeves 52 and 54 which are fixedly fastened in a tubular casing 56 which is integral with the foundation member 10, not itself visible in the view of FIG. 7 which is on a larger scale than FIG. 1.

The hollow shaft 50 also serves as a hydraulic cylinder in which a piston 58 is axially movable. A piston ring 60 provides a tight seal between the piston 58 and the inner wall of the shaft 50. The piston 60 is urged towards the upper terminal position illustrated in FIG. 7 by two helical springs 62 and 64 which abut against the underside of the piston and against a cylinder head 66. Hydraulic fluid is admitted to the cylinder space above the piston 58 through a port (not shown) in the usual manner. It will be understood that the truck crane is equipped with a storage tank for hydraulic fluid, a pump drawing the fluid from the tank, and the necessary conduits including valves for delivering the fluid under pressure to the several hydraulic motors described, such as the piston 58 and the hollow shaft 50, and to release the pressure fluid to the storage tank in a manner well known in itself and not requiring further amplification. The pressure pump may be driven directly by the engine of the truck or be equipped with an electric drive actuated by the electrical system of the truck, or by a separate source of electric current. Movement of the piston 58 in a downward direction, as viewed in FIG. 7, is thus pressure-fluid actuated, while the upward return movement is effected by means of the springs 62 and 64.

The piston 58 carries a piston rod 68 which is guided in its axial movement in a bore of a plug 70. The plug is axially secured in the central bore of the shaft 50 between a heavy spring washer 74 registering with a mating circumferential groove in the shaft 50 and the bottom wall 26 of the base member 24 which is formed with an opening 72 for passage of the piston rod 68. A fluid-tight seal between the plug 70 and the shaft 50 is provided by a gasket ring 76, and a packing 78 permits axial movement of the piston rod 68 through the plug 70 without fluid leakage.

The reciprocating movement of the piston rod 68 is transformed into pivoting movement of the pillar 28 about the pivot pin 30 by means of a cross head 80 to which two connecting links 84 are pivotally fastened by pins 82. The links 84 are hingedly fastened to the shaft 40. Because of the radial spacing of the shaft 40 from the pivot pin 30, admission of hydraulic fluid to the hollow shaft 50 displaces the pillar 28 from its inoperative position toward the vertical operative position against the restraint of the springs 62, 64 which tend to move the pillar into its inclined inoperative position.

FIG. 7 also shows some features of the detail structure of the pillar 28 which is assembled from a plurality of plate members 86 between which the shaft 40 carries the fastening lugs 88 of the cylinder member of the jack 38 and the two pulleys 90 of the tackle arrangement previously discussed in connection with FIG. 5.

Figure 10:
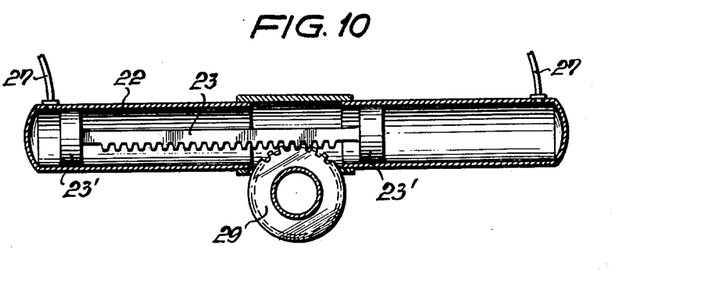
FIG. 10 shows a detail of the crane of FIG. 1 in sectional plan view on an enlarged scale.

The arrangement for pivoting the jib assembly about a vertical axis is shown in FIG. 7 in elevational cross section. It is illustrated in FIG. 10 in plan section.

The hollow shaft 50 carries an external circumferential gear rim 29 meshing with a rack 23 through an opening in a tubular cylinder 22 which is mounted on the housing 20 as seen in FIGS. 1 to 3. Two pistons 23' mounted on the ends of the rack 23 are in sealing engagement with the cylinder 22 and define two pressure spaces therein which communicate with the hydraulic system of the truck through pipe connections 27 and suitable valving (not shown) under the operator's control so that the jib may be pivoted about the axis of the shaft 50 by admitting pressure fluid selectively to one of the pressure spaces in the cylinder 22 while releasing it from the other pressure space.

The hydraulic motor constituted by the hollow shaft 50 and the piston 58 which is reciprocable therein is dimensioned in such a manner relative to the jack 38 that hydraulic fluid admitted simultaneously to the motor and the jack will first erect the pillar 28 from the inoperative to its operative position before the pressure of the fluid on the jack 38 is adequate to raise the jib from its rest position. This relationship is diagrammatically indicated in FIG. 9.

Figure 9:
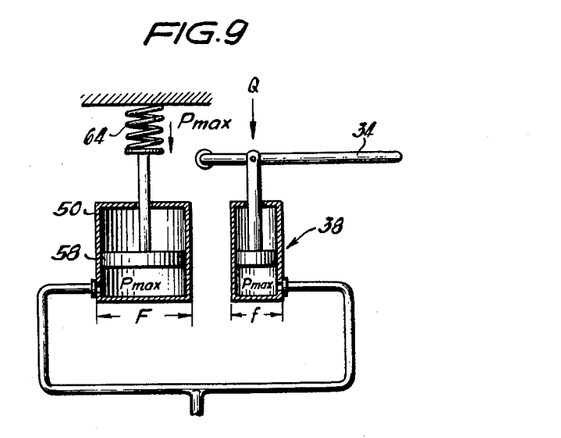
FIG. 9 diagrammatically illustrates the operation of the hydraulic system of the truck crane of FIG. 1.

When hydraulic fluid is admitted to the space in the hollow shaft 50 above the piston 58 (as viewed in FIG. 7, but below the piston as viewed in the diagrammatic representation of FIG. 9), the relatively large force exerted on the piston 58 compresses the springs 62 and 64 (of which the latter only is shown in FIG. 9) and pivots the pillar 28 into a vertical position, before the smaller force developed by the action of the same fluid pressure on the smaller piston of the jack 38 will balance and overcome the downward force Q developed by the weight of the jib 34 without any additional load. If the effective areas of the two pistons are F and f respectively, the springs 64, 62 must be selected in such a manner that the equation $$\frac{P_{max}}{F} \times f \gtreqless Q$$

is satisfied, wherein $P_{max}$ is the pressure of the hydraulic fluid adequate completely to erect the pillar 28 against the restraint of the springs 62, 64.

The hydraulic jack 38 is thus prevented from raising the jib 34 from its rest position unless the pillar 28 be first erected to its vertical position.

Figure 8:
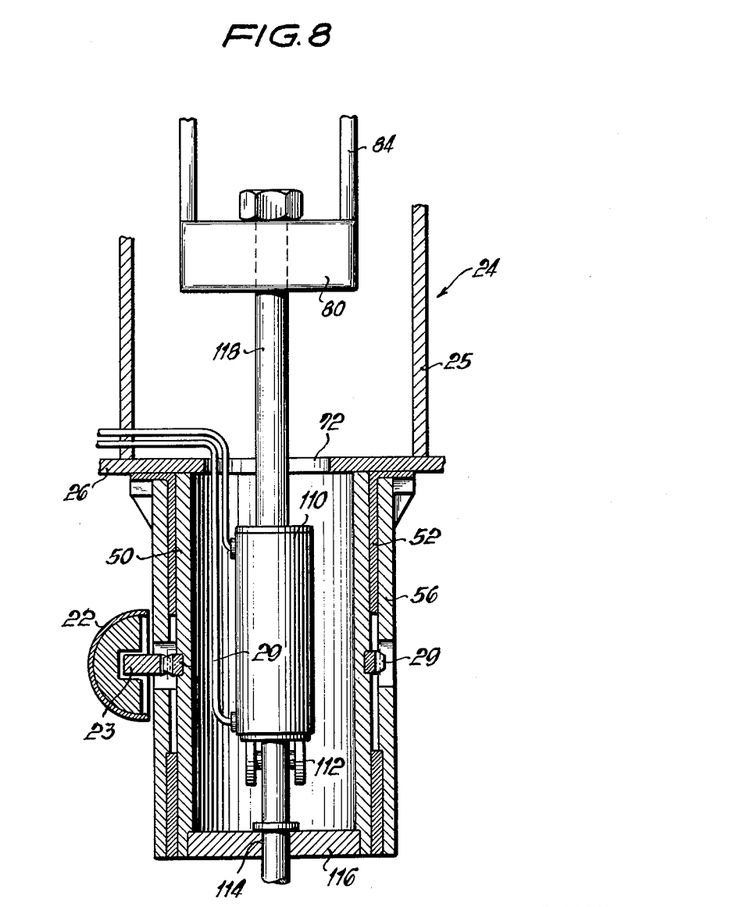
FIG. 8 illustrates a modification of the device of FIG. 7.

FIG. 8 shows a modification of the apparatus of FIG. 7 which does not rely on resilient members for any operating movement of the truck crane. The crane rotates on the truck in the same manner as illustrated in FIG. 7, that is, by rotation of the hollow shaft 50 in the casing 56, and the structure is otherwise also identical with that seen in FIG. 7. The hydraulic system, however is a double acting hydraulic jack 110 the cylinder member of which is pivoted to a pin 114 by means of a hinge 112. The pin is fixedly fastened to a transverse bottom member 116 in the hollow shaft 50. The jack 110 extends axially in the hollow shaft 50 and its piston rod 118 is operatively connected to the shaft 40 by means of a cross head 80 and connecting links 84 as heretofore described in connection with the apparatus of FIG. 7. Because of the hinged attachment of the jack 110 to the foundation structure, the jack, cross head 119, and the links 120 may form an axially rigid unit the length of which is varied by admission of pressure fluid to the two cylinder spaces above and below the piston of the jack 110 in the usual manner.

It should be understood of course that the foregoing disclosure relates to only preferred embodiments of the invention, and that it is intended to cover all changes and modifications of the examples of the invention herein chosen for the purpose of the disclosure which do not constitute departures from the spirit and scope of the invention set forth in the appended claims.

What is claimed and desired to be protected by Letters Patent of the United States is:

1. A truck crane comprising a vehicle constituting a support; a base member mounted on said support for rotation about a vertically extending axis; an elongated pillar member having one end portion secured to said base member for pivoting movement in a substantially vertical plane; elongated jib means having one end portion hingedly secured to the other end portion of said pillar member; hydraulic jack means interposed between said pillar member and said support for actuating said pivoting movement of said pillar member between an operative position in which said pillar member extends substantially vertically from said support, and an inoperative position; and actuating means for hingedly moving said jib means relative to said pillar member toward and away from a rest position in which said jib means longitudinally extends in a substantially horizontal direction when said pillar member is in said inoperative position thereof.

2. A truck crane as set forth in claim 1, wherein said jack means is operatively connected to said one end portion of said pillar member.

3. A truck crane as set forth in claim 1, wherein said jack means includes a resilient member permanently urging said pillar member to move toward said inoperative position, and a pressure-fluid actuated motor for moving said pillar member toward said operative position thereof against the restraint of said resilient member.

4. A truck crane as set forth in claim 1, wherein said jack means includes tubular cylinder means coaxial with said axis and mounted on said base member, said cylinder means being journaled in said support and secured thereon against axial movement, and pressure-fluid actuated piston means axially slidable in said cylinder means and secured to said pillar member.

5. A truck crane as set forth in claim 1, further comprising tubular cylinder means coaxial with said axis and mounted on said base member, said cylinder means being journaled in said support to provide a pivot for said pivoting movement of said base member; and a double-acting hydraulic motor in said cylinder means interposed between said support and said one end portion of said pillar member for actuating said pivoting movement thereof.

6. A truck crane as set forth in claim 1, further comprising a source of pressure fluid, said actuating means including second hydraulic jack means; and conduit means communicating with said source, said first-mentioned jack means and said second jack means for supplying said fluid from said source to said jack means in such a manner when said pillar member is in said inoperative position and said jib means is in said rest position that said pillar member will first pivotally move from said inoperative substantially to said operative position and said jib means will thereafter move away from said rest position.

7. A truck crane as set forth in claim 1, wherein said actuating means includes second hydraulic jack means operatively connected to said jib means and to said base member.

8. A truck crane as set forth in claim 7, further comprising a shaft member having a substantially horizontal axis parallel to the axis of said pivoting movement of said pillar member, and mounted on said pillar in radially spaced relationship to the pivoting axis thereof, said hydraulic jack means being each operatively connected to said shaft member, and being respectively connected to said jib means and to said support.

9. A truck crane as set forth in claim 8, further comprising a pivot pin on said jib means hingedly connecting said second hydraulic jack means to said jib means; and lifting tackle including a plurality of pulley means rotatable on said shaft member and on said pivot pin respectively, and rope means trained over said pulley means.

10. A truck crane comprising a vehicle having platform means elongated in the direction of movement; an operator's cab upwardly extending from said platform means and having a roof line extending transversely of said platform means; a foundation member on said platform means; a movable base member mounted on said foundation member for rotation about a vertically exetnding axis; an elongated pillar member having one end portion secured to said base member for pivoting movement in a substantially vertical plane; elongated jib means having an end portion hingedly secured to the other end portion of said pillar member; hydraulic jack means interposed between said pillar member and said foundation member for actuating said pivoting movement of said pillar member between an operative position in which said pillar member extends substantially vertically from said platform, and an inoperative position; and actuating means for hingedly moving said jib means relative to said pillar member toward and away from a rest position in which said jib means longitudinally extends in a substantially horizontal direction and is substantially located below said roof line when said pillar member is in said inoperative position thereof, and in which at least said end portion of said jib means is located above said roof line when said pillar member is in the operative position thereof.

11. A truck crane as set forth in claim 10, wherein said pillar member is adapted to rotate relative to said platform into a position in which said jib means when in said rest position thereof extends transversely of said platform means over substantially equal distances from the median plane of said platform means, when said pillar member is in the operative position.

12. A truck crane as set forth in claim 10, further comprising means interconnecting said hydraulic jack means and said actuating means for preventing hinged movement of said jib means away from said rest position thereof by said actuating means unless said pillar member is first pivoted by said jack means from the inoperative to the operative position thereof.

References Cited in the file of this patent
UNITED STATES PATENTS

| | | |
|---|---|---|
| 2,564,929 | Shoemaker | Aug. 21, 1951 |
| 2,895,622 | Sundin | July 21, 1959 |